United States Patent [19]

Nagase

[11] Patent Number: 5,408,072

[45] Date of Patent: Apr. 18, 1995

[54] VARIABLE TEMPERATURE HIGH FREQUENCY INDUCTION HEATING SOLDERING IRON

[75] Inventor: Takashi Nagase, Osaka, Japan

[73] Assignee: American Hakko, Inc., Santa Clarita, Calif.

[21] Appl. No.: 191,016

[22] Filed: Feb. 2, 1994

[51] Int. Cl.6 .............................................. H05B 6/14
[52] U.S. Cl. .................................... 219/616; 219/667; 219/634
[58] Field of Search ............... 219/616, 635, 667, 674, 219/676, 643, 618, 633, 634, 229, 233, 236, 238, 241

[56] References Cited

U.S. PATENT DOCUMENTS

| | | | |
|---|---|---|---|
| 4,745,264 | 5/1988 | Carter | 219/553 |
| 4,795,886 | 1/1989 | Carter, Jr. | 219/505 |
| 4,839,501 | 6/1989 | Cowell | 219/237 |
| 4,877,944 | 10/1989 | Cowell et al. | 219/553 |
| 4,924,067 | 5/1990 | Wilhelmson | 219/241 |
| 5,182,427 | 1/1993 | McGaffigan | 219/616 |

Primary Examiner—Philip H. Leung
Attorney, Agent, or Firm—Graham & James

[57] ABSTRACT

The present invention generally relates to a high frequency soldering iron. In particular, the soldering iron of the present invention is provided with a tip which is directly heated for a quick heating to a desirable temperature set by a temperature setting means. The soldering iron is also provided with a sensor for detecting the temperature of the soldering iron tip. A temperature comparator compares the sensed tip temperature against the set soldering temperature to maintain the tip temperature constant at the set temperature.

7 Claims, 5 Drawing Sheets

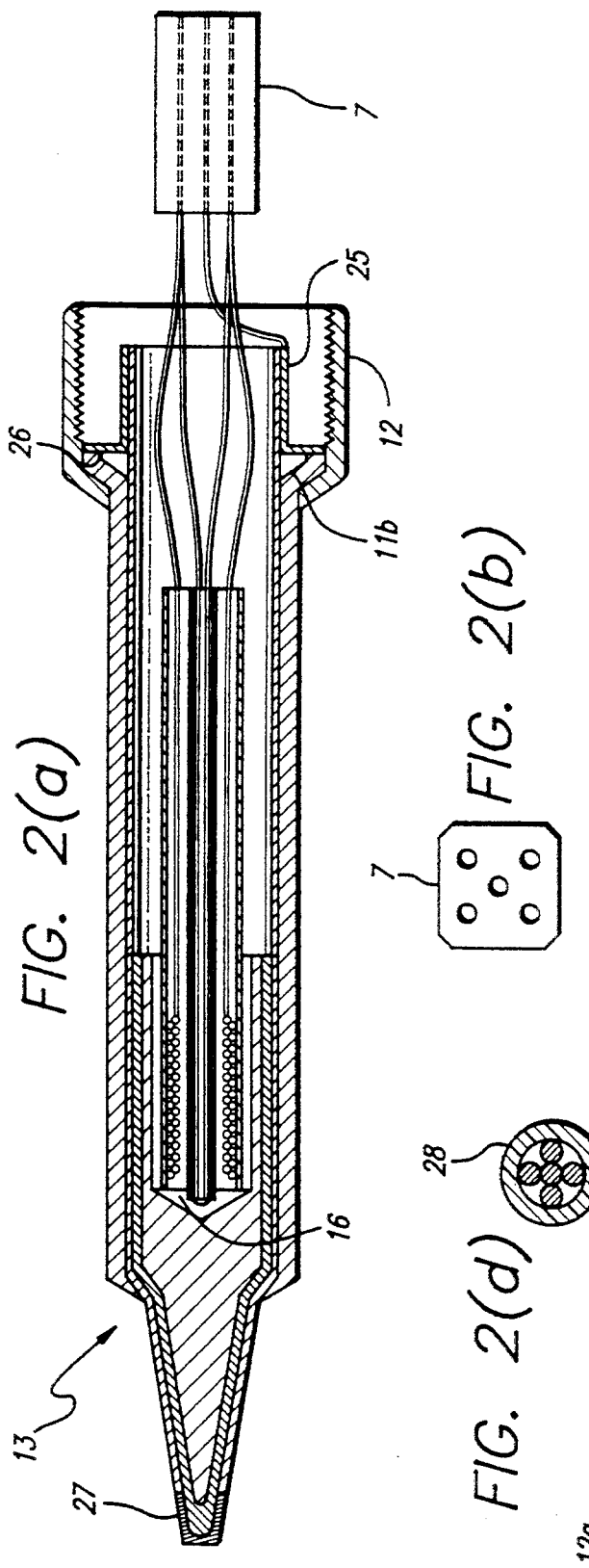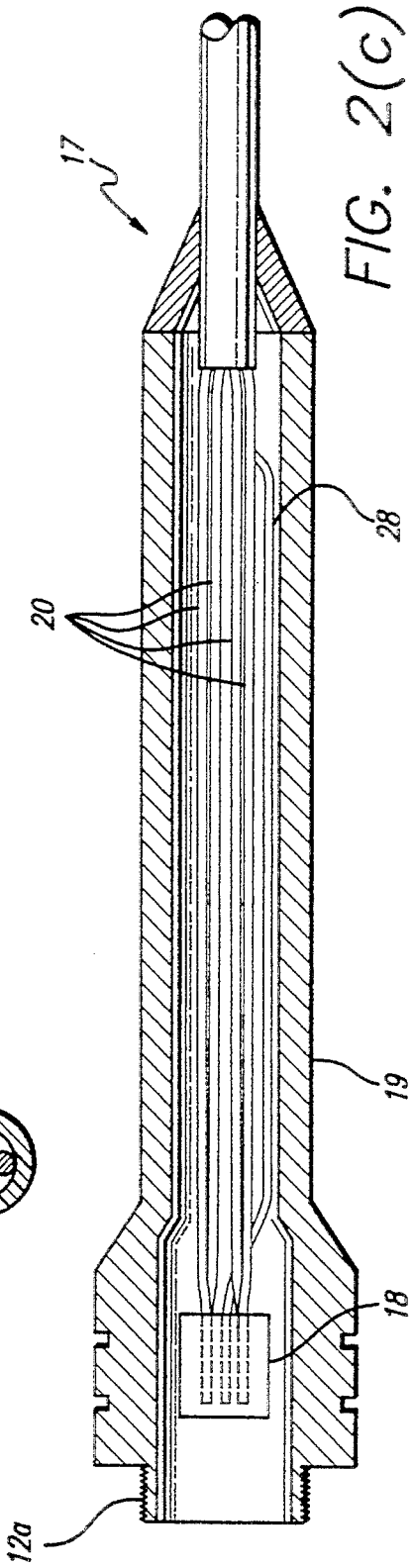
FIG. 2(a)  FIG. 2(b)  FIG. 2(c)  FIG. 2(d)

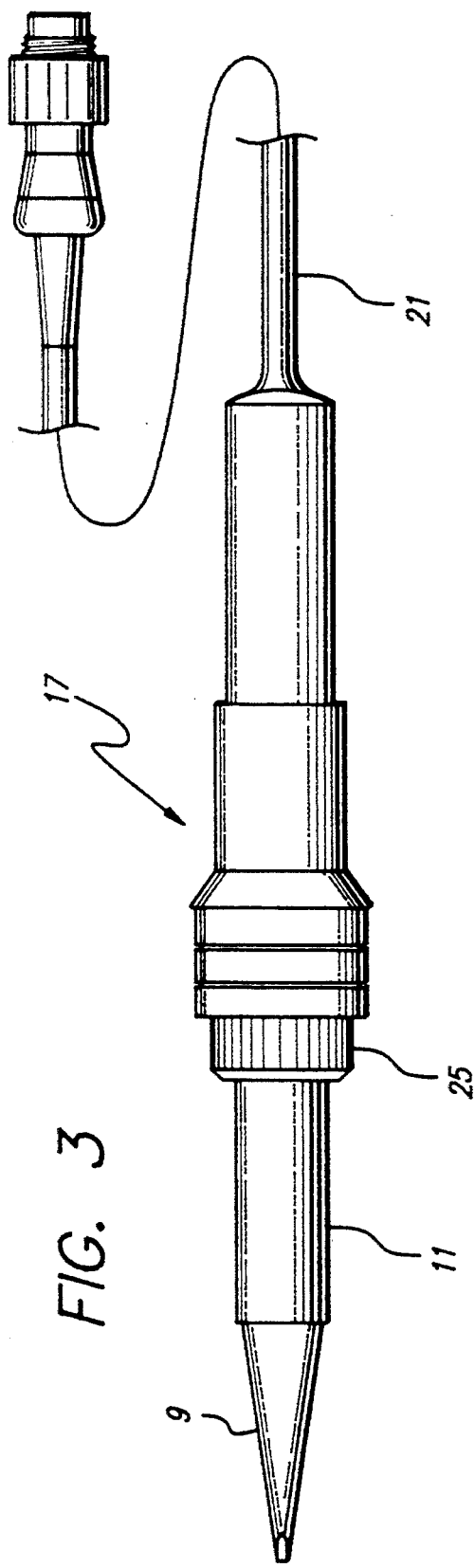
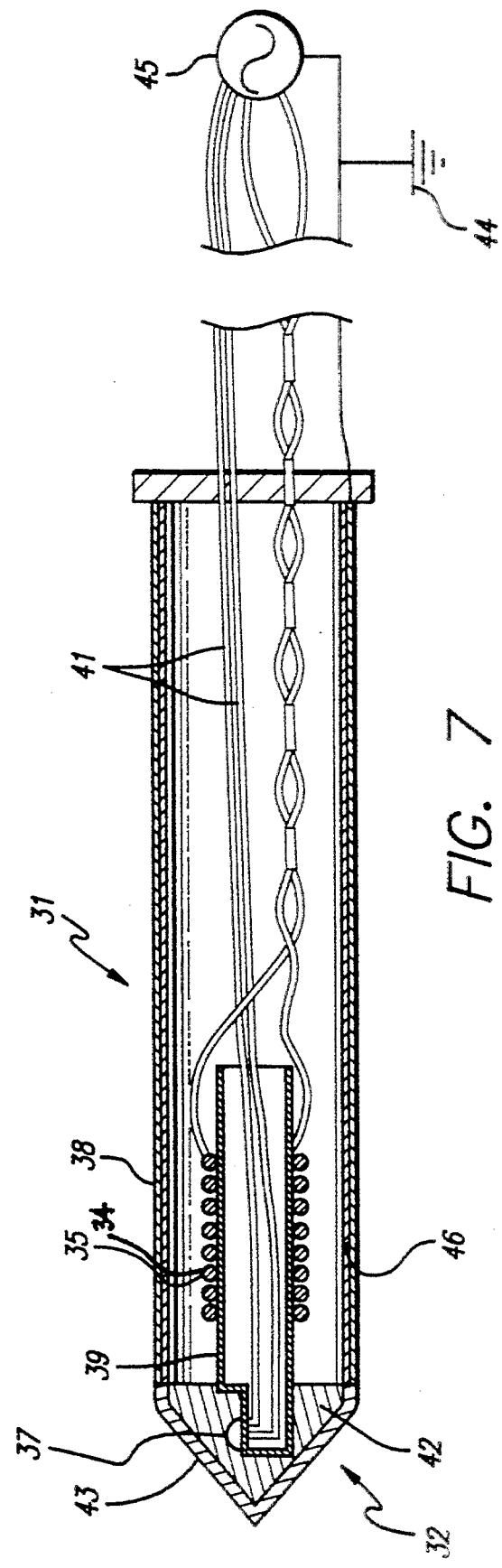

VARIABLE TEMPERATURE HIGH FREQUENCY INDUCTION HEATING SOLDERING IRON

FIELD OF THE INVENTION

The present invention generally relates to a high frequency induction heating soldering iron. In particular, the present invention relates to a soldering iron adapted to control a soldering temperature independent of the Curie temperature of the tip material for precision soldering work.

BACKGROUND OF THE INVENTION

U.S. Pat. No. 4,839,501 issued Jun. 13, 1989 to Cowell entitled "Cartridge Soldering Iron" discloses a cartridge soldering iron having a handle and a soldering iron held in the handle. In a high frequency induction heating soldering iron of the Curie temperature control type such as the one disclosed in the '501 patent, the heating tip must be replaced according to the desired soldering temperature so that the temperature to be obtained corresponds with the Curie temperature of the tip material. Hence, the soldering iron of the '501 patent requires soldering tips made of different materials having different Curie temperatures depending on the desired temperatures. A number of required replacement tips is high for a conventional soldering iron utilizing the Curie temperature controlled tips which increases the required processing steps and time, and adds to the overall cost of soldering.

FIG. 6 shows a graph of tip temperatures against time in a conventional soldering iron. For achieving a target temperature of 400° C. a contentional soldering iron takes about 60 seconds. Further, a temperature variation after achieving the target temperature reaches as much as 85° C.

SUMMARY OF THE INVENTION

The present invention provides an improved high frequency current soldering iron having faster heating capability as well as an ability to maintain a more constant soldering temperature.

In a preferred embodiment, the high frequency current soldering iron of the present invention employs a heating assembly having a sensor connected to a temperature controller and heating coils connected to a power source which are wrapped around a ceramic core. A tip assembly is provided having a copper based tip coated with an iron plating, and the tip assembly houses the part of the heating assembly having the sensor. The engaged tip assembly and the heating assembly are encased by a protective enclosure pipe except for the exposed tinned tip of the tip assembly for soldering. A temperature control unit is further provided to set the desired soldering temperature and to process the temperature detected by the sensor so as to effect an accurate control over the soldering tip temperature.

Another embodiment of the present invention provides a simpler construction. Further features and advantages of the present invention will be appreciated by review of the following detailed description of the present invention.

Accordingly, it will be appreciated that the present invention provides an improved high frequency current soldering iron having significantly improved accuracy in achievement of the soldering temperature and its maintenance while having a simple construction.

BRIEF DESCRIPTION OF THE DRAWINGS

FIG. 2(a) shows a cross-section of the assembled tip assembly;
FIG. 2(b) shows a cross-section of a connector;
FIG. 2(c) shows a cross-section of a handle grip;
FIG. 2(d) shows a cross-section of a connector cable;
FIG. 3 shows an exterior view of the tip assembly and the handle;
FIG. 7 shows a second embodiment of the present invention.

DETAILED DESCRIPTION OF THE INVENTION

Figure 1A:
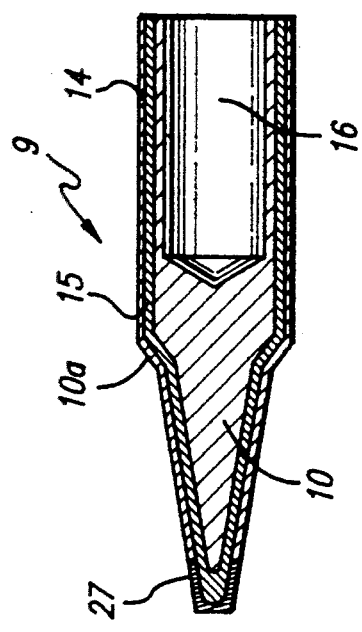
FIG. 1(a) shows an enclosure for a soldering iron tip according to the present invention.
Figure 1B:
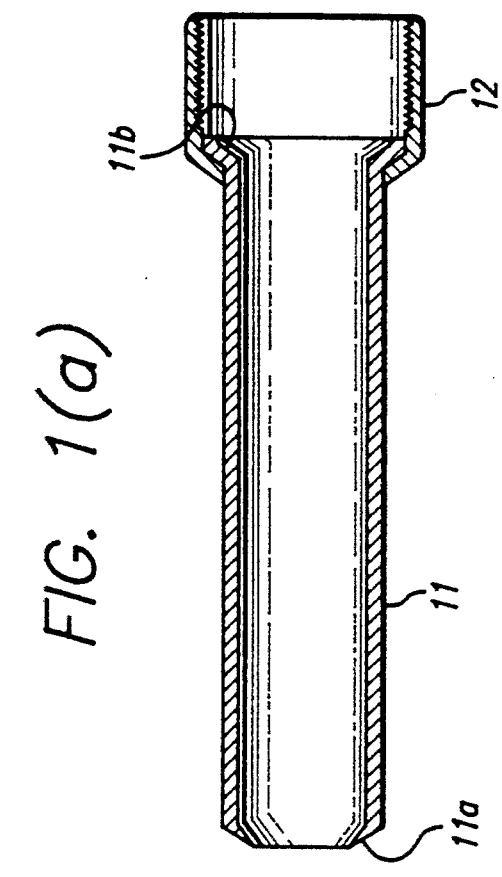
FIG. 1(b) shows the soldering iron tip portion.
Figure 1C:
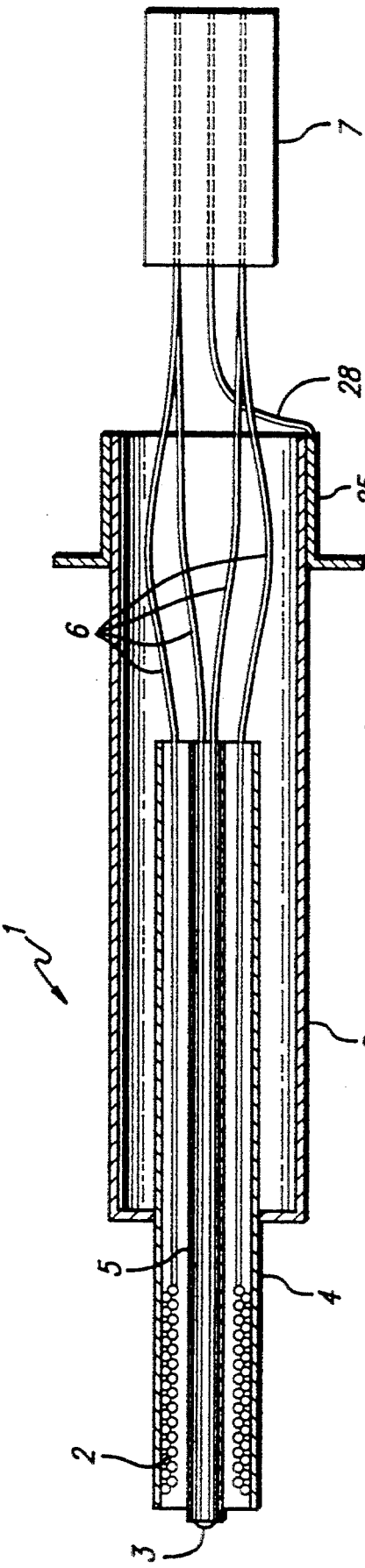
FIG. 1(c) shows heating elements.

Turning more particularly to the drawings, FIGS. 1(a), 1(b) and 1(c) show an exploded view of a preferred embodiment of the high frequency induction heating soldering iron according to the present invention. FIG. 2(a) shows an assembled tip assembly for the soldering iron. FIG. 1(a) shows a protective enclosure pipe 11 for protecting a heat induction portion 1 and a soldering iron tip 9 shown in FIG. 1(b) and also for shielding a magnetic flux leak. The enclosure pipe 11 may be made from materials such as 403 stainless steel. One end of the enclosure pipe 11 situated away from a power source is provided with a lip 11a. The lip 11a provides a snug fit when the composite tip 9 is inserted into the enclosure pipe 11 through its other end having a flared edge 11b. A threaded enclosure pipe fitting or nut 12 is provided at the latter end of the enclosure pipe 11 to fix the flared edge 11b.

The composite tip 9 shown in FIG. 1(b) is made of a highly heat conductive but non-magnetic copper base 10 which is surfaced with an iron plating layer 15 and further with a highly magnetically permeable chrome plating layer 14 except at the tip which is surfaced with tin 27. The copper base 10 is provided with a shoulder 10a to catch the lip 11a of the enclosure pipe 11, thereby providing a close fit between the enclosure pipe 11 and the composite tip 9. The interior of the composite tip 9 defines an opening 16 to receive a portion of the heat induction portion having a sensor 3 shown in FIG. 1(c). The fit between the composite tip 9 and the heat induction portion 1 is also close. In the preferred embodiment, the sensor 3 is a platinum wire sensor. However, other types of sensors may be used. For instance, the sensor 3 may be a K-type thermocouple (CA-type thermocouple).

The induction heating portion 1 shown in FIG. 1(c) heats the composite tip 9, although the induction heating portion 1 itself does not get heated. The sensor 3 and a five-pin connector 7 are connected by two internal wires 6 which travel through a hollow ceramic core 5. The other two internal wires 6 form induction heating coils 2 and are also connected to the five-pin connector 7. A hollow ceramic tube 4 encases the ceramic core 5, a portion of which is wrapped with the induction heating coils 2. A portion of the ceramic tube 4 is encased in a cylindrical pipe 8 which is made of, for instance, 304 stainless steel having a low magnetic permeability. A ground wire 28 connects the connector 7 and a metal grounding fitting 25 which abuts a connection point 26.

FIG. 2(c) shows a handle 17 having a handle grip 19 with a threaded engagement 12a which provides an engagement with the enclosure pipe fitting 12. This also connects a connector receptacle 18 with the pin connector 7 of the tip assembly 13, thereby establishing connections between the internal wires 6 and wires 20 of the handle grip 19, and between the ground wire 28 of the tip assembly 13 and that of the handle grip 19. A cross-sectional view of the connector 7 is shown in FIG. 2(b).

FIG. 3 shows the soldering iron as assembled. A connector cable 21 is shown attached to the end of the handle 17. A cross-sectional view of the connector cable 21 is shown in FIG. 2(d).

The above described structure of the soldering iron functions according to the following principle. When an electromagnetic induction is produced in the high frequency induction coils 2, an electromagnetic flux is produced. When this occurs, an eddy current is produced near the surface of the tip 9, i.e., in or about the chrome plating 14 and the iron plating 15, which in turn produces Joule heating according to:

$$I^2 R$$

where
I = eddy current and
R = resistance of the plating.

The heat is subsequently transmitted to the copper base 10. The sensor 3 provided at the end of the heat induction portion 1 detects the temperature of the soldering iron tip as it is heated, and the temperature control unit described as below and shown in FIG. 4 controls the temperature of the soldering unit 13 according to the detected temperature.

Figure 4:
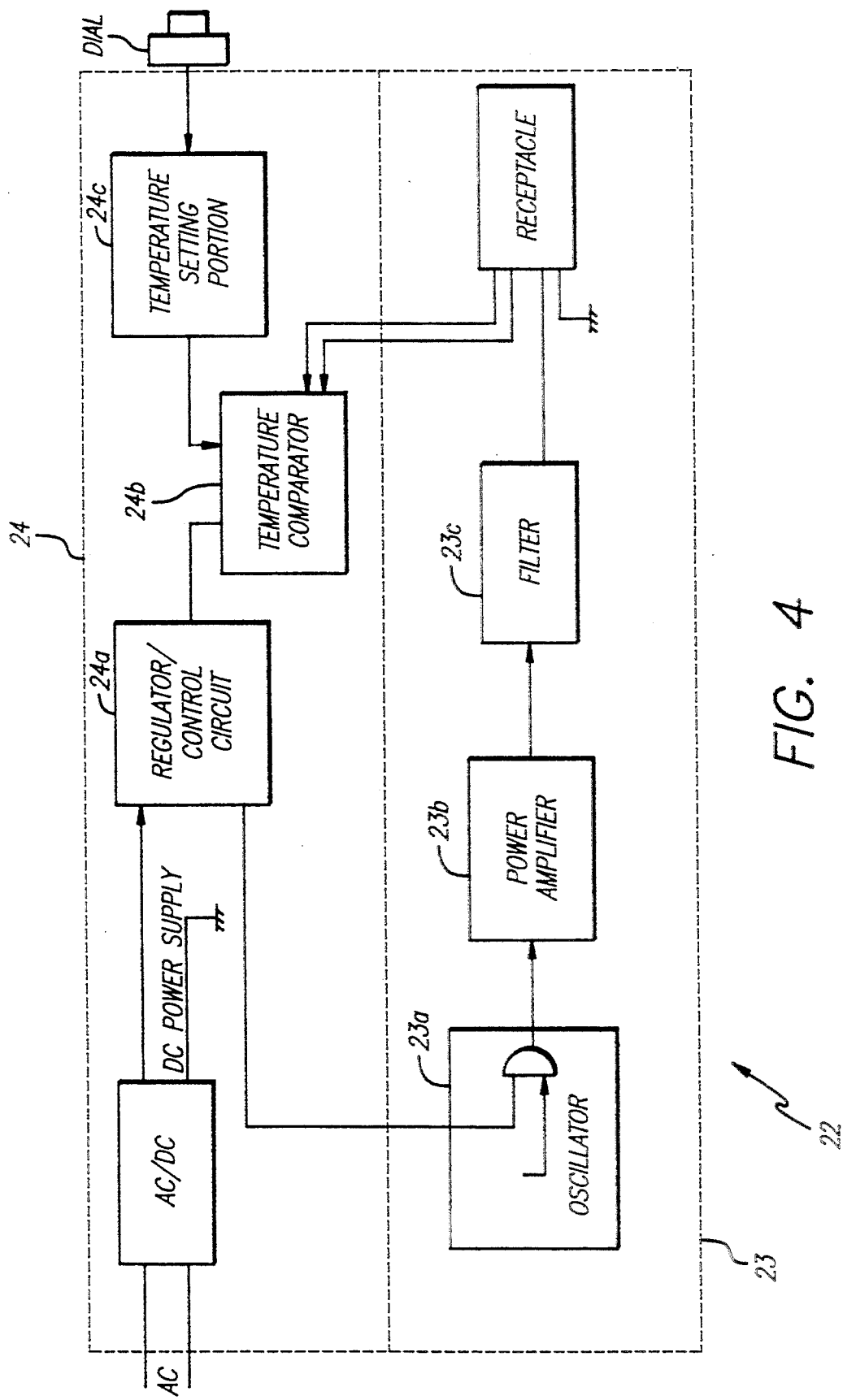
FIG. 4 shows a control circuit.

In FIG. 4, a control circuit diagram is shown, which controls the heating of the tip assembly 13. A controller main body 22 employs two principle parts: a high frequency current generator 23 and a temperature controller 24. The high frequency current generator 23 employs an oscillator 23a, a power amplifier 23b and a filter 23c. The high frequency current generator 23 produces oscillations with a frequency of 13.56 MHz and turns them on and off with a quad 2 input AND gate 23d provided in the oscillator 23a.

The temperature control portion 24 employs a regulation control circuit 24a, a temperature comparator 24b and a temperature setting portion 24c. The temperature setting portion 24c controls the temperature with a scaled control dial 25 within a range of approximately 390° F. to approximately 900° F. In place of a control dial, a digital controller such as a ten key button input may be used. The temperature comparator 24b detects and compares a temperature of the temperature setting portion 24a and a resistance value of the sensor 3 of the induction heating portion 1. By inputting a digital signal "0" at an input gate of the quad 2 input AND gate 23d of the oscillator 23a, the oscillator 23a terminates an oscillation output. Inputting a digital signal "1" effects an oscillation output to the power amplifier 23b, and the temperature of the high frequency soldering iron main body 17 is controlled via the filter 23c. In this way, unlike the conventional soldering iron whose soldering temperature depends on the Curie temperature of the material of the tip, requiring replacement of the tip every time a different soldering temperature is desired, the soldering iron of the present invention requires only one iron tip for a wide range of temperatures.

The present invention provides for a direct heating of the composite tip 9. Directly heating the composite tip 9 is advantageous in providing a compact soldering iron structure. In particular, the distance between the tip and the grip is shortened to provide a user with a better manipulability. It also allows less heat to be transferred to the grip portion.

Figure 5:
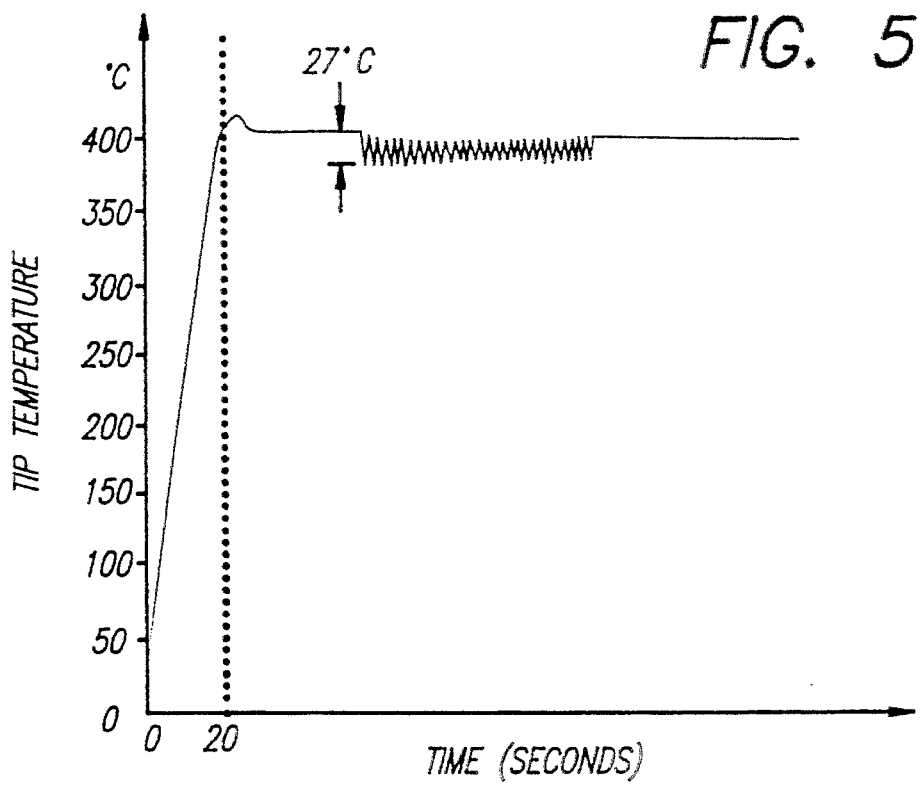
FIG. 5 shows temperature characteristics of the soldering iron tip of the preferred embodiment of the present invention.
Figure 6:
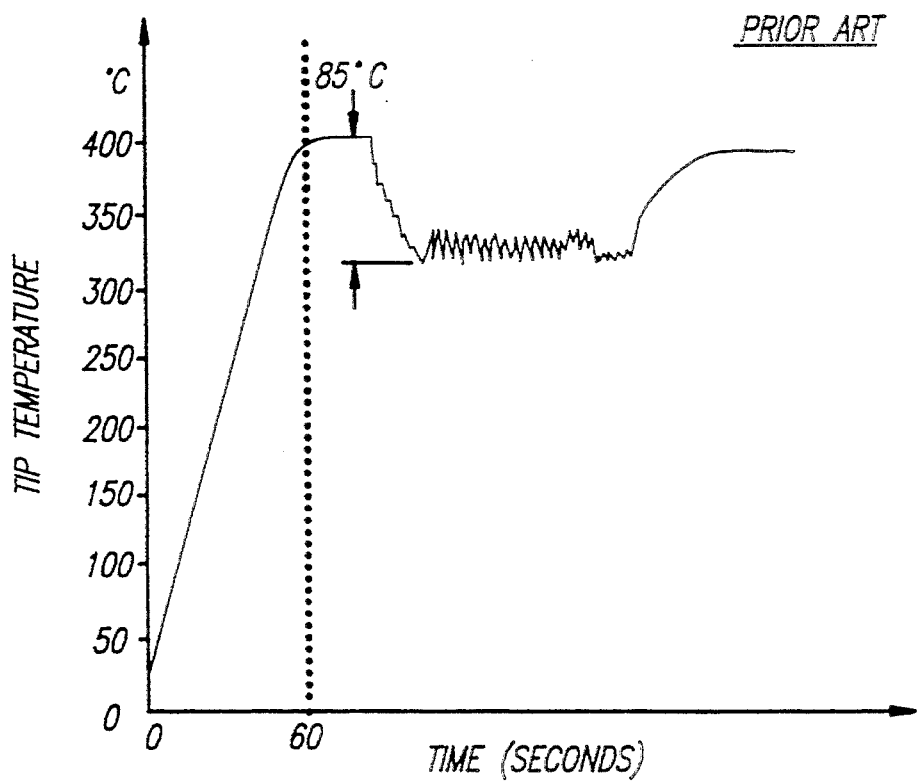
FIG. 6 shows temperature characteristics of a prior art soldering iron at the tip.

Further, direct heating of the tip 9 significantly cuts the time required to achieve a desired tip temperature. In a conventional soldering iron system, the tip is not directly heated. Rather, a heater portion and a tip portion make up separate components, and the transfer of heat takes time. FIG. 5 is a graph showing tip temperature characteristics of the soldering iron of the present invention. The graph shows the time required to achieve a predetermined target temperature of 400° C. In the present invention, the soldering iron is able to achieve 400° C. within approximately 20 seconds, a significant improvement over the prior art soldering iron whose tip does not achieve 400° C. until about 60 seconds later.

Further, in the present invention a temperature deviation after reaching the predetermined tip temperature is a mere 27° C. as opposed to up to 85° C. for the prior art soldering iron. Since the present invention provides the sensor 3 in the induction heating portion 1, the maintenance of a desired soldering temperature is greatly improved and significantly cuts temperature deviations. More accurate temperature maintenance contributes to a better quality control in a soldering process, which is important for precision soldering work such as soldering semiconductor parts.

A typical soldering operation temperature is between 200° C. and 400° C. approximately, which is independent of the Curie temperature of the material. For instance, pure iron has the Curie temperature of 780° C. As can be appreciated, the high frequency induction heating soldering iron of the present invention allows soldering at a variable temperature.

FIG. 7 shows another embodiment of the high frequency induction heating soldering iron 31 according to the present invention. An induction heating assembly 46 includes a hollow heating core 39, which is made of a ferromagnetic material such as carbon steel of malleable iron and coated with an alumina ($Al_2O_2$) for insulation and coils 35 which are also coated with alumina 34. A sensor 37 is affixed to the core 39 with alumina, and the elements of the induction heating assembly 46 are encased by a stainless steel (for instance, SUS 304) casing 38 which is grounded at 44. Wires 41 connect the sensor 37 with an oscillator 45.

A cartridge type tip 32 has a copper base 42 coated by an iron plating 43, and fits over the sensor 37 so that the heating core 39 and the copper base 42 of the cartridge tip 32 become thermally connected. The tip 32 is detachable from the heating unit 46.

In this embodiment, the soldering iron of the present invention operated as follows. A high frequency current of 13.56 MHz is produced from the oscillator 45 and is supplied to the coils 35 around the hollow heating core 39. The high frequency current causes an electromagnetic induction to be created over the surface of the ferromagnetic core 39 according to a phenomenon called the skin effect.

When a high frequency current is supplied to a conductor, the skin effect causes the current to concentrate in the surface or skin area of the conductor. This tendency to concentrate in the skin area becomes more prominent as the frequency of the current increases. The skin effect is expressed in the following equation.

$$S = 5.03 \times 10^3 \sqrt{\frac{p}{fu}} \quad (cm)$$

where:
S is the depth of the current permeates in the conductor
P is the resistivity of the material ($\Omega.M$)
f is the current frequency (Hz)
$\mu$ is the magnetic permeability.

The skin effect also causes Joule heating. In the second embodiment, since the core 39 is ferromagnetic, the heat is created in the core 39 and subsequently transferred to the copper base 42 and the iron plating layer 43 of the cartridge tip 32.

The stainless steel encasing 38 and the cartridge tip 32 shield the current generated in the ferromagnetic core 39. The thickness of non-ferromagnetic base 42 of the cartridge tip 32 is designed to be sufficiently larger than the depth of penetration of current, S, so as to prevent the current from leaking.

Having described the preferred embodiment of the high frequency induction soldering iron according to the present invention, it should be apparent that various additional objects and advantages have been attained by the present invention and that a variety of modifications can be made within the scope and spirit of the present invention.

What is claimed is:

1. A high frequency induction soldering iron having:
   heat induction means having a hollow tube and coils wound around the tube, the tube having two ends;
   an elongated and conically shaped soldering iron tip portion having an outer surface, a pointed tip for soldering and an elongated base defining an opening therein;
   a layer of iron plating covering the outer surface of the tip portion except the tip thereof;
   a layer of chrome plating covering the iron plating layer on the tip portion;
   a layer of tin coating the tip of the tip portion;
   a sensor coupled with one end of the tube of the heat induction means for detecting a temperature of the tip;
   a protective enclosure pipe encasing the elongated base of the tip portion and the heating induction means to shield a magnetic flux leak;
   a temperature control means to set a desired temperature for the tip and to control the detected temperature thereof; and
   a power source connected to the induction heating means to supply power.

2. A high frequency induction soldering iron as claimed in claim 1, wherein the tip portion is detachable from the heat induction means.

3. A high frequency induction soldering iron as claimed in claim 1, wherein the sensor is connected to the temperature control means through the cylindrical tube of the heat induction means.

4. A high frequency induction soldering iron as claimed in claim 1, wherein the base of the tip portion is made of a heat conductive and non-magnetic permeable material.

5. A high frequency induction soldering iron as claimed in claim 4, wherein the material is copper.

6. A high frequency induction soldering iron as claimed in claim 1, wherein the soldering temperature is between 200° C. and 400° C. approximately, and is lower than a Curie Temperature of the tip.

7. A high frequency induction soldering iron as claimed in claim 1, wherein the tip of the tip portion is directly heated.

* * * * *